(12) United States Patent
Karlberg et al.

(10) Patent No.: US 11,210,312 B2
(45) Date of Patent: Dec. 28, 2021

(54) STORING DATA ITEMS AND IDENTIFYING STORED DATA ITEMS

(71) Applicant: Microsoft Technology Licensing, LLC, Redmond, WA (US)

(72) Inventors: Jan-Ove Almli Karlberg, Tromsø (NO); Tor Kreutzer, Tromsø (NO); Åge Andre Kvalnes, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 727 days.

(21) Appl. No.: 16/003,307

(22) Filed: Jun. 8, 2018

(65) Prior Publication Data

US 2019/0377815 A1     Dec. 12, 2019

(51) Int. Cl.
*G06F 16/25* (2019.01)
*G06F 16/21* (2019.01)

(52) U.S. Cl.
CPC ............ *G06F 16/25* (2019.01); *G06F 16/211* (2019.01)

(58) Field of Classification Search
CPC ........ G06F 16/13; G06F 16/211; G06F 16/22; G06F 16/25; G06F 16/29
See application file for complete search history.

(56) References Cited

U.S. PATENT DOCUMENTS

| 5,970,496 | A | 10/1999 | Katzenberger |
| 9,729,659 | B2 | 8/2017 | Sengupta et al. |
| 2003/0036888 | A1 | 2/2003 | Bentley |
| 2010/0011031 | A1 | 1/2010 | Huang et al. |
| 2012/0159098 | A1* | 6/2012 | Cheung ............... G06F 12/0261 711/162 |
| 2012/0233417 | A1 | 9/2012 | Kalach et al. |
| 2014/0059355 | A1 | 2/2014 | Schuette et al. |
| 2014/0201170 | A1 | 7/2014 | Vijayan et al. |
| 2014/0359771 | A1 | 12/2014 | Dash et al. |
| 2015/0032725 | A1 | 1/2015 | Barykin et al. |
| 2015/0220751 | A1 | 8/2015 | Syben |

OTHER PUBLICATIONS

Wu, Tin-yu, et al., "Improving Accessing Efficiency of Cloud Storage Using De-Duplication and Feedback Schemes", IEEE Systems Journal, vol. 8, No. 1, Mar. 2014, pp. 208-218. (Year: 2014).*

(Continued)

*Primary Examiner* — Scott A. Waldron

(57) ABSTRACT

In one aspect, a data item is written to a data chunk of a stream segment. The stream segment includes a stream segment header and a plurality of data chunks. A first identifier of the data item is written to the stream segment header of the stream segment. A second identifier of the data item is written to a header of the data chunk of the stream segment. In another aspect, a stream segment header of a stream segment is queried with a query identifier. The querying identifies if any of the data items in the data chunks of the stream segment have the query identifier. If any of the data items in the data chunks of the stream segment have the query identifier, the data chunks of the stream segment are queried with the query identifier to identify which data chunks of the stream segment have the query identifier.

20 Claims, 5 Drawing Sheets

(56) References Cited

OTHER PUBLICATIONS

Singh, Amritpal, et al., "Bloom filter based optimization scheme for massive data handling in IoT environment", Future Generation Computer Systems, vol. 82, pp. 440-449, available online Dec. 21, 2017. (Year: 2017).*

"International Search Report and Written Opinion Issued in PCT Application No. PCT/US19/034777", dated Aug. 30, 2019, 11 Pages.

Cachin, et al., "Policy-based Secure Deletion", In Proceedings of ACM SIGSAC conference on Computer & communications security, Nov. 4, 2013, pp. 259-270.

Reardon,, et al., "SoK: Secure Data Deletion", In Proceedings of IEEE Symposium on Security and Privacy, May 19, 2013, pp. 301-315.

* cited by examiner

STORING DATA ITEMS AND IDENTIFYING STORED DATA ITEMS

TECHNICAL FIELD

The present disclosure relates to methods, computer systems and computer programs for storing data items and for identifying stored data items.

BACKGROUND

There are many situations in which data is stored, typically for later use or access, etc. In some cases, there is a large number of data items that need to be stored over time. The data items themselves are often individually small. Nevertheless, the fact that the number of data items is large presents problems concerning one or more of efficient writing of the data items to storage and efficient searching and retrieval of the stored data items.

SUMMARY

According to a first aspect disclosed herein, there is provided a computer program comprising a set of computer-readable instructions, which, when executed by a computer system, cause the computer system to carry out a method of storing a data item, the method comprising:
receiving, in computer memory of the computer system, a data item to be stored;
writing the data item to a data chunk of a stream segment, said stream segment including a stream segment header and a plurality of data chunks;
obtaining a first identifier from the data item;
writing the first identifier of the data item to the stream segment header of the stream segment to which the data item is written;
obtaining a second identifier from the data item, the second identifier being different from the first identifier; and
writing the second identifier of the data item to a header of the data chunk of the stream segment to which the data item is written;
whereby the first identifier in the stream segment header can be used to identify if any data items in any of the data chunks of the stream segments include the first identifier, and whereby the second identifier in the header of the data chunk of the stream segment can be used to identify if any data items in the data chunk include the second identifier.

There may be provided a non-transitory computer-readable storage medium storing a computer program as described above.

Some examples described herein provide an improvement in computer technology in which a technical advantage is that the improved computer technology enables fast search and retrieval of data items, and also enables fast deletion of data items. The data items can be searched and retrieved quickly, within a reasonable and practical time frame. In particular, a technical problem that is addressed by examples described herein is that searching through a large number of data items stored in a computer system to identify specific data items can be slow as typically each data item has to be inspected in turn.

The operations set out above may be carried out in a different order. For example, in at least some examples, the method can obtain one or both of the first and second identifiers before writing the data item to the data chunk, etc.

Once the data chunk has been assembled as discussed above, and possibly once one or more other criteria have been met (such as for example a maximum size for the chunk has been reached), the data chunk can be written to persistent storage.

In an example, the first identifier is a coarse identifier that applies to a first number of data items in the data chunks of the stream segment, and wherein the second identifier is a fine identifier that applies to a second, smaller number of data items in the data chunks of the stream segment.

According to a second aspect disclosed herein, there is provided a method of storing a data item, the method comprising:
receiving, in computer memory, a data item to be stored;
writing the data item to a data chunk of a stream segment, said stream segment including a stream segment header and a plurality of data chunks;
obtaining a first identifier from the data item;
writing the first identifier of the data item to the stream segment header of the stream segment to which the data item is written;
obtaining a second identifier from the data item, the second identifier being different from the first identifier; and
writing the second identifier of the data item to a header of the data chunk of the stream segment to which the data item is written;
whereby the first identifier in the stream segment header can be used to identify if any data items in any of the data chunks of the stream segments include the first identifier, and whereby the second identifier in the header of the data chunk of the stream segment can be used to identify if any data items in the data chunk include the second identifier.

In an example, the first identifier is a coarse identifier that applies to a first number of data items in the data chunks of the stream segment, and the second identifier is a fine identifier that applies to a second, smaller number of data items in the data chunks of the stream segment.

At any particular point in time, there may in general be zero, or one, or more, data items in the data chunks of the stream segment to which the second identifier applies. In general, the number of data items to which the second identifier applies will be less than the number of data items to which the first identifier applies. The data items to which the second identifier applies will often be a subset of the data items to which the first identifier applies.

In an example, the first identifier is a tenant identifier, which identifies an organization, and the second identifier is a user identifier, which identifies an individual user who is a member of the organization.

In an example, the first identifier of the data item is written into a probabilistic data structure contained in the stream segment header of the stream segment to which the data item is written.

In an example, the second identifier of the data item is written into a probabilistic data structure contained in the header of the data chunk of the stream segment to which the data item is written.

In an example, the method comprises:
carrying out consistent hashing on the first identifier obtained from the data item; and
identifying the stream segment to which the data item is to be written based on the result of the consistent hashing on the first identifier obtained from the data item.

In an example, the stream segment is part of a log stream, there being plural log streams each containing different one or more stream segments, and identifying the stream segment to which the data item is to be written based on the result of the consistent hashing comprises identifying the log stream having said stream segment based on the result of the consistent hashing.

The use of plural of log streams allows for parallel processing of data items, which provides for high throughput of the data items.

In an example, writing the data item to a data chunk of a stream segment comprises writing the data item as a line entry in the data chunk, the line entry comprising a line header, and the method comprises:

writing a schema ID to the line header, the schema ID identifying how to extract at least one of the first identifier and the second identifier from the data item.

The schema ID, stored in the line header, can be used later when the data is being searched for retrieval and/or deletion purposes. Storing the schema ID in the line header means that the identifiers can be extracted later regardless of the format in which they identifiers are saved in the data item. It also allows for data items with different schemas to be present within the same chunk, which improves the functionality of the process as it makes it more universally applicable. Moreover, if other (third or further) identifiers are used, schema IDs for those may be stored.

In an example, the method comprises:

writing data concerning the data item to a stream partition such that the stream partition indexes the stream segment to which the data item is written.

The data concerning the data item may be one or more of the file name of the stream segment to which the data item is written, a time relating to the data item, and the first identifier of the data item. This enables a subsequent search for a data item to be carried out more quickly and efficiently.

In another example, there is provided a computer system comprising:

at least one processor;

and at least one memory including computer program instructions;

the at least one memory and the computer program instructions being configured to, with the at least one processor, cause the computer system to carry out a method of storing a data item as described above.

According to a third aspect disclosed herein, there is provided a computer program comprising a set of computer-readable instructions, which, when executed by a computer system, cause the computer system to carry out a method of identifying a data item stored in the computer system based on a query identifier of the data item, the method comprising:

querying a stream segment header of a stream segment with a query identifier, wherein the stream segment comprises a stream segment header and one or more data chunks, wherein each data chunk comprises data items and the stream segment header comprises identifiers of the data items in the data chunks, wherein the querying of the stream segment header identifies if any of the data items in the data chunks of the stream segment have said query identifier; and if any of the data items in the data chunks of the stream segment have said query identifier, querying said data chunks of the stream segment with said query identifier to identify which data chunks of the stream segment have said query identifier; and at least one of: retrieving at least one of the data items in at least one of the data chunks of the stream segment that has said query identifier; and deleting at least one of the data items in at least one of the data chunks of the stream segment that has said query identifier.

There may be provided a non-transitory computer-readable storage medium storing a computer program as described above.

In an example, the method comprises for all data chunks of the stream segment that have said query identifier, querying the data items in said data chunks to identify which data items in said data chunks have said query identifier; and at least one of: retrieving all of the data items in all of the data chunks of the stream segment that have said query identifier; and deleting all of the data items in all of the data chunks of the stream segment that have said query identifier.

In an example, the identifiers of the data items in the stream segment header are contained in probabilistic data structures.

In an example, said identifier of the data item is a first identifier, each data chunk having a header which includes second identifiers of the data items in the data chunk, the second identifier being different from the first identifier, and the method comprises:

for each data chunk of the stream segment that has said first query identifier, querying the header of each of said data chunks with a second query identifier to identify if any data items in the data chunks have the second query identifier.

In an example, the method comprises, for a data chunk that is identified as having a data item that has the second query identifier, querying the data items in said data chunk to identify which data items in said data chunk have said second query identifier.

In an example, the first identifier is a coarse identifier that applies to a first number of data items in the data chunks of the stream segment, and wherein the second identifier is a fine identifier that applies to a second, smaller number of data items in the data chunks of the stream segment.

In an example, the first identifier is a tenant identifier, which identifies an organization, and the second identifier is a user identifier, which identifies an individual user who is a member of the organization.

In an example, the second identifiers of the data items contained in a probabilistic data structure in the header of the data chunks.

In an example, the data items are line entries in the data chunks, each line entry comprising a line header, each line header comprising a schema ID which identifies how to extract an identifier from the data item, and querying the data items in a data chunk to identify which data items in said data chunk have the query identifier comprises inspecting the schema ID from the line header of a line entry and using the identified schema to extract the identifier from the line entry.

In another example, there is provided a computer system comprising:

at least one processor;

and at least one memory including computer program instructions;

the at least one memory and the computer program instructions being configured to, with the at least one processor, cause the computer system to carry out a method of identifying a data item stored in the computer system as described above.

In another example, there is provided a method of identifying a data item stored in the computer system as described above.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
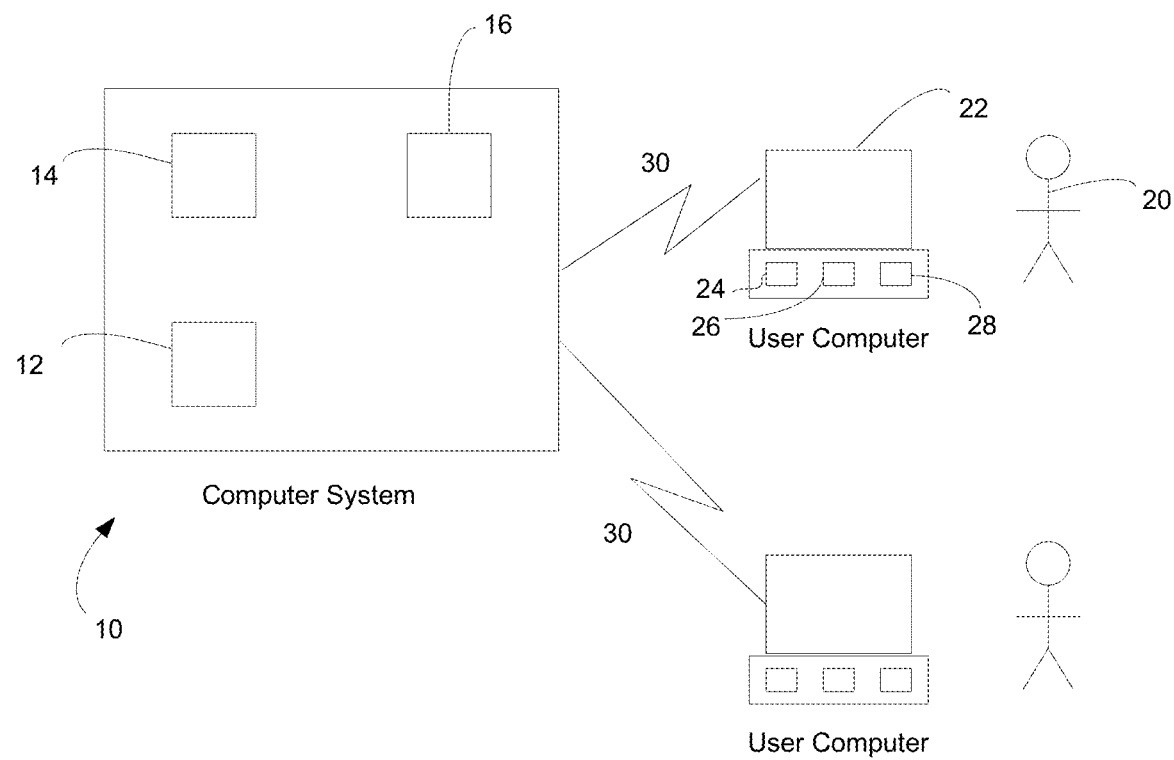
FIG. 1 shows schematically an example of a computer system according to some examples described herein and users interacting with the computer system.

As mentioned, there are many situations in which data is stored, typically for later use or access, etc. It is often the case that there is a large number of data items that need to be stored over time. The data items themselves are often individually small. Nevertheless, the fact that the number of data items is large (and indeed can be very large in some cases) presents problems concerning one or more of efficient writing of the data items to storage and efficient searching and retrieval of the stored data items.

In a computer system, data items may in general be generated by (human) users, devices and software applications. Examples of such data items include system logs, data sets used for training machine learned models, logs from services and systems experiencing bugs or other problems, data (results) generated by analytics, and other data necessary for analytics purposes. Data items of this type are often generated at a high rate and often unpredictably. It is nevertheless often necessary to be able to search such data items based on one or more criteria to identify the data items that meet the one or more criteria. With large amounts of data, this can be difficult to achieve in a short amount of time.

A particular current issue of increasing importance is user privacy and use and retention of user data by organizations. Many countries have introduced or are introducing legislation that amongst other things requires organizations to disclose to a user the data that the organization holds concerning that user. This is often referred to as the "right to access". In addition, many countries have introduced or are introducing legislation that amongst other things requires organizations, on request of a user, to delete data that the organization holds concerning that user. This is often referred to as the "right to be forgotten". As a specific example at the time of writing, the European Union has adopted the General Data Protection Regulation (GDPR) which aims primarily to give control to users over their personal data and which sets strict timetables for organizations to comply with requests to disclose the data they use and to delete that data on request. (For example, currently for GDPR compliance, a user request for deletion must be completed by the organization within 30 days.)

However, reading the entire volume of data upon request, and returning the results within a given deadline, can be expensive and, in some cases, impossible or at least practically impossible. To circumvent these issues, many organizations have changed their retention policies on data to be less than the maximum allowed processing time of e.g. a deletion request. While this approach is satisfactory in some situations, there are cases where data, including for example system logs or other information pertaining to users, must be stored for longer periods of time. What is required is a technical solution to this problem.

Some examples described herein provide improved computer systems that enable fast search and retrieval of data, and enable fast deletion of data, as necessary. The data may be related to customers and (human) users. By making these operations more efficient, it is possible to avoid short default retention times for high impact data and also increase the volume of data that can be retained.

Some specific examples of the present disclosure will be described in detail below. It should be noted that not all of the components described below will be required in all situations or in all implementations.

The specific examples discussed herein will be given in terms of an example of a live software system or service in which data is generated as part of the system's operation. One example of the data being stored is that of system logs, including specifically usage logs, which record details of users' interactions with the system. Such usage logs may provide information on how those interactions affect system performance and behavior. For example, when a user of a Web-based document editing suite makes changes to a document, such logs would contain data concerning when the user signed in, from which IP (Internet Protocol) address the login occurred, what document was changed, when the change happened, how many bytes where changed, how costly these operations were, and so on. Nevertheless, the present disclosure may be applied to other types of data, including for example data sets used for training machine learned models, logs from services and systems experiencing bugs or other problems, data (results) generated by analytics, and other data necessary for analytics purposes, including for example data concerning system alerts, emails, posts on social media accounts, etc. A particular example of data analytics that may be applied is to learn where the data has come from (e.g. specific users, devices, software functions, etc.).

As mentioned, and especially with the introduction of legislation governing how data related to users must be handled, it is desirable to ensure that all data pertaining to a given user can be traced back to the user, and located, retrieved and deleted if necessary or requested. Furthermore, the service provider must often guarantee that this can be done within a strict response time. In the context of enterprise software systems, it is also possible for a customer group or organization, such as a business (company), herein referred to as a "tenant", to request that all data pertaining to its individual users be deleted. To facilitate the retrieval of data for both users and tenants, examples described herein effectively tie two identifiers to each piece of data being stored, namely the tenant and user identifiers (IDs). The IDs may be unique, or at least effectively or practically unique. For example, a tenant ID may be a universally unique identifier (UUID), also known as a globally unique identifier (GUID). A UUID or GUID is a 128-bit number used to identify information in computer systems. It should be noted that usage logs already contain these identifiers in most cases, as they often are necessary for efficient debugging of problems, as well as usage analysis.

Usage logs are generated in an ad-hoc fashion as users interact with the software system. Each interaction by a user with the system may generate one or more records detailing the behavior of the various software components. As user interactions occur, the logs are generally constructed by adding one line after the other in a chronological fashion.

Due to how logs are generated and written in known systems, a comprehensive search for all data related to a specific user would entail a linear scan through the entire volume of logs. Although it is possible to cluster logs based on for example user and tenant IDs, this is traditionally not done since it is difficult to reconcile with how the logs are generated. That is, building such indices or clustered streams would necessitate a) keeping large amounts of data in memory for extended periods of time, b) reading back previously written logs, and re-processing these in a batched fashion (which is both memory and input/output intensive), and c) combinations of the two. The cost of each of these approaches makes it difficult to efficiently support retrieval and deletion of customer data for large volumes of system logs (and other types of data that are generated in a similar fashion).

In overview, in one aspect the present disclosure provides a method of storing a data item to persistent storage. A data item to be stored is received in computer memory. The data item is written to a data chunk of a stream segment, the stream segment including a stream segment header and a plurality of data chunks. A first identifier is obtained from the data item. The first identifier of the data item is written to the stream segment header of the stream segment to which the data item is written. A second identifier is obtained from the data item, the second identifier being different from the first identifier. The second identifier of the data item is written to a header of the data chunk of the stream segment to which the data item is written. The first identifier in the stream segment header can be used to identify if any data items in any of the data chunks of the stream segments include the first identifier. The second identifier in the header of the data chunk of the stream segment can be used to identify if any data items in the data chunk include the second identifier.

In the specific example described herein, the first identifier may be a tenant ID, which identifies an organization, such as for example a business/company. In this specific example, the second identifier may be a user ID, which identifies (human) users of the system. The users may be associated with one or more tenants. For example, each user may be an employee of a tenant. The use of first and second identifiers, which are obtained, stored and used as described herein, provides a tiered or hierarchical approach for one or more of fast search, retrieval and deletion of data. The first identifier may be used as a relatively coarse filter and the second identifier may be used as a relatively fine filter. In some examples, there may be more than two tiers of identifiers/filters, which provide progressively finer filters and/or alternative filters. As just one example of this, another identifier which may be used as a filter is a (geographical) region. For example, some tenants are present in multiple geographies. In such cases, it would then be possible to use triplets of the form <tenant id, region, used id>. For example, there may be a triplet <tenantID, EUROPE, userID> and another triplet <tenantID, ASIA, userID> and so on. The order (that is, the hierarchy) of the identifiers may be changed, depending on the results that are desired to be achieved.

Another example of hierarchical identifiers is for a specific device, where the coarse ID may be the IP address of the device and the fine ID may be the MAC address of the device. There are also different types of identifiers which are used to identify mobile devices, which may be used in the case that the data represents usage logs. Another example of identifiers that could be of interest in usage logs is the combination of operating system and browser (e.g. <iOS, Safari>, <Android, Chrome>, <Windows, Edge>); in such cases, what would be the coarse key and the fine key respectively would be dependent on the specific usage log. It is also possible to tie mobile traffic to cell towers: e.g. the coarse ID identifies the tower while the fine ID identifies the mobile device. As yet another example, if data flows through a set of functions as part of processing, identifiers designating these functions could be of interest. In the case that a function is found to be faulty, it would then be possible to associate data with the function. The coarse ID could then be associated with functions that handle more than some given amount of data items, while the fine ID could correspond to functions that handle less than the given threshold. This also opens up the possibility of a multi-tiered solution.

Referring now to FIG. 1, this shows schematically an example of a computer system 10 with which users 20 can interact via user computers 22 according to an example of the present disclosure. The computer system 10 has one or more processors 12, working memory or RAM (random access memory) 14, which is typically volatile memory, and persistent (non-volatile) storage 16. The persistent storage 16 may be for example one or more hard disks, non-volatile semiconductor memory (e.g. a solid-state drive or SSD), etc. The computer system 10 may be provided by one individual computer or a number of individual computers. The user computers 22 likewise have the usual one or more processors 24, RAM 26 and persistent storage 28. The user computers 22 can interact with the computer system 10 over a network 30, which may be one or more of a local area network and the Internet, and which may involve wired and/or wireless connections.

The computer system 10 may provide a software service for the users, some specific examples of which are discussed above. In the specific example considered here, at least some of the users 20 are associated with an organization, such as a business, etc., and may for example be employees of the organization. Such organizations are referred to herein as "tenants" (as the organization may be regarded as "renting" the service provided by the computer system 10). The computer system 10 may for example provide a "cloud computing" service in which the computer system 10 is remote from the users 20 and stores, manages, and processes data for the users 20, with the connection between the users 20 and the computer system including the Internet, rather than this being carried out by a local server or a personal computer.

Figure 2:
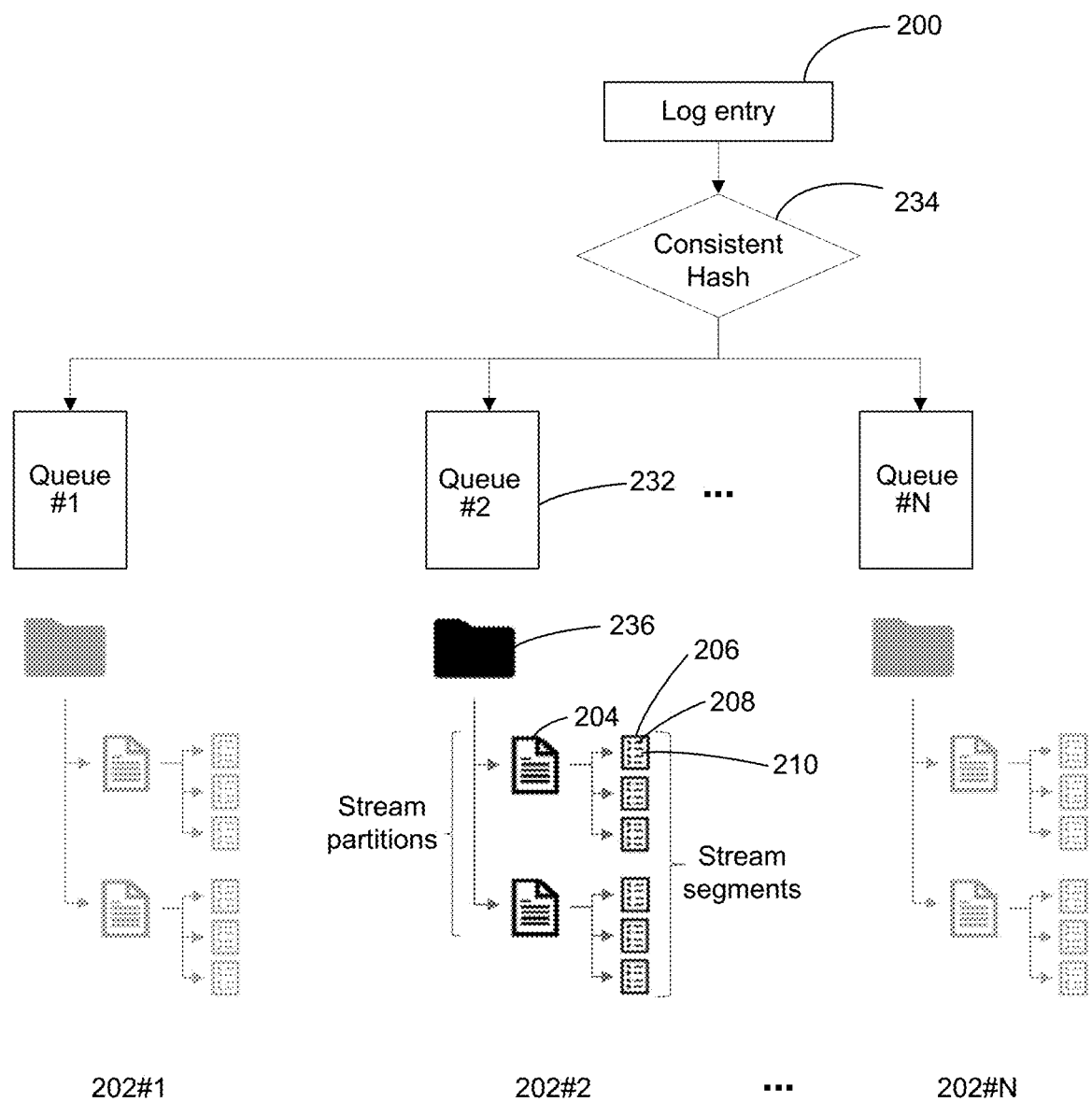
FIG. 2 shows schematically an overview of the operation and data structures of an example of the present disclosure.

Referring now to FIG. 2, this shows schematically an overview of the operation of an example of the present disclosure. As mentioned, not all of the items shown in FIG. 2 and described in detail below are required in all situations or in all implementations. FIG. 2 may be regarded as showing schematically the flow of an example of a method of storing data items to persistent storage 16 of the computer system 10. It should be noted that some operations in the method may be carried out in a different order from the specific example described here and indicated schematically in FIG. 2. FIG. 2 also shows schematically the data structures that are used in this example.

A brief overview of the main items shown in FIG. 2 will be given next. A more detailed discussion of each of the main items and their usage will then be given.

At 200, data enters or is generated by the computer system 10. In this specific example, the data is system logs which are generated as part of operation or use of the computer system 10. A specific example of the data is usage logs, which record details of users' interactions with the computer system 10.

In this specific example, the total volume of data (here, generated logs) entering at 200 is split into multiple "log streams" 202, indicated as 202 #1, 202 #2, . . . 202 #N in FIG. 2. This allows for parallel processing of the logs while keeping the memory footprint and other system resource usage manageable. This provides for high throughput of the data and also better utilization of multi core (and multi computer) configurations. However, in other examples, for example when the total volume of data that is to be processed per unit time is relatively small, it is not necessary to split the data into plural log streams.

Each log stream 202 contains at least one stream partition 204. A stream partition 204 can be regarded as a data structure. Typically, each log stream 202 contains plural stream partitions 204. In an example, the stream partitions 204 are created according to definable policies, which can be based on for example time, data size, or both. Specific examples of this will be discussed further below. The stream partitions 204 index or reference the files holding the actual data (e.g., the stream segments 206 in the example discussed below). The stream partitions 204 can be annotated, with for example meta data, which can make searching of the data faster and more efficient. The annotations also make it possible to direct searches for a given piece of data more efficiently. Again, specific examples of this will be discussed further below.

Figure 4:
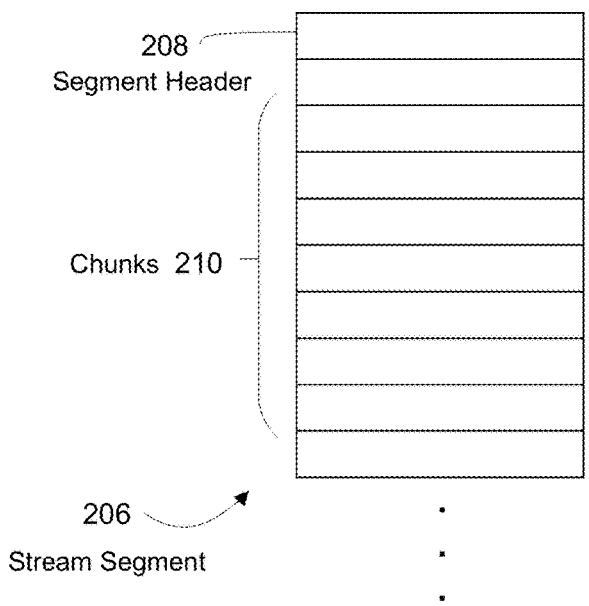
FIG. 4 shows schematically an example of a stream segment of an example of the present disclosure.

Each stream partition 204 indexes (e.g., references) a set of stream segments 206. In this example, the stream segments 206 are the unit of storage for the data within the computer system 10, e.g. the unit at which data is managed in the computer system 10. A stream segment 206 can be regarded as a data structure. As also shown schematically in FIG. 4, each stream segment 206 contains a segment header 208. In an example, the segment header 208 contains a segment filter which, in an example, is a probabilistic data structure which allows quick determination of whether the data within the stream segment 206 must be inspected more thoroughly. This segment filter is populated using a first identifier of the data. In an example, the first identifier is a relatively coarse, higher order identifier. In the specific example where the data is user logs and the users 20 are associated with a tenant, this first identifier may be a tenant ID, that is, an identifier of the business or other organization with which the users 20 are associated. In general, there will be plural tenants, each with their own tenant ID and each with their own set of associated users 20. In operation of an example of the segment filter, the first identifier is used as a key in the probabilistic segment filter so as to identify stream segments 206 that contain data relating to that first identifier, as will be discussed further below. The segment header 208 may also contain other information, such as segment length and other optional meta data, including for example information identifying individual processes/computer systems/machines in the case that multiple different processes/computer systems/machines, respectively, provide input to the computer system 10; etc.

In addition to the segment header 208 with its segment filter, each stream segment 206 contains a set of "chunks" 210. A chunk 210 can again be can be regarded as a data structure. Each chunk 210 contains a number of data items, such as log entries for the user logs in this specific example. Each chunk 210 also contains a chunk filter 212 (see also FIG. 3, discussed further below). This chunk filter 212 is a probabilistic data structure, similar to the segment filter. However, the chunk filter 212 is populated using a second identifier of the data. In an example, the second identifier is a relatively fine, lower order identifier. In the specific example where the data is user logs, the second identifier can be tied directly to the end user associated with the generation of the particular data item, and may be for example a unique user identifier or user ID for the user. In operation of an example of the chunk filter 212, the second identifier is used as a key in the probabilistic chunk filter 212 so as to identify chunks 210 that contain data relating to that second identifier, as will be discussed further below.

Each of the components described in overview above will now be described in more detail, starting at the lowest level with the chunk 210.

Data, such as user logs or other types of data discussed above, arriving at the computer system 10 is written in chunks 210. The size of the chunks 210 may be configurable. The size of the chunks 210 may be constrained by memory consumption at the computer system 10 and the desired upper bound on how long data should stay in memory 14 before being persisted to persistent storage 16, such as one or more hard disks 16. Simply put, a larger capacity of RAM 14 at the computer system 10 means that the chunks 210 may be larger and vice versa. An advantage of writing data in a chunked manner is efficiency: larger sequential writes to persistent storage 16 are more efficient and offer higher throughput than smaller and more frequent random writes to persistent storage 16. This is particularly relevant in the case that the persistent storage 16 is provided by hard disks, which is currently still common given the relatively low cost of data storage per unit (e.g. per gigabyte) provided by hard disks. Another advantage is that this also allows the chunk data to be prepended with a chunk filter 212. As noted, the chunk filter 212 in an example is a probabilistic data structure which contains information about the data stored in the chunk 212. The chunk filter 212 enables quick determination of whether data pertaining to a given user is present in the chunk 210.

A number of different types of probabilistic filters may be used for the chunk filter 212 (and for the segment filter in the segment header 208). A property of the probabilistic filters that are used in this example is that they can give false positives, but no false negatives. This means that when scanning logs, for example searching for data corresponding to some specific user, it is possible to query the chunk filter 212 using the user ID for the specific user, before inspecting the actual log data itself. If the chunk filter 212 returns a negative response when queried with the user ID for the specific user, then the chunk 210 can be skipped altogether as it means that none of the data stored in the chunk 210 contains that user ID. By tuning the chunk filters 212 such that the rate of false positives is small, considerable speed-ups can be achieved since the volume of data that must be read and searched can be reduced dramatically. (To explain further, when creating these filters there is a trade-off between the size of the filter (in bits), the number of hashing functions used (more functions reduces the probability of false positives, provided that the filter is large enough and is not "filled up", but is more costly), and the rate of false positives. By making the filter large enough and having enough hash functions, very low false positive rates can be achieved. However, this comes at the cost of increased cost at insertion/query time, as well as storage space. The filters should be tuned to be "good enough", e.g. providing a false positive rate that is low, but without incurring unnecessary computational and storage overhead. Dependent on the scenario, different trade-offs could be made here.)

While building the chunk 210, the second, finer identifier, which in examples is to be used in subsequent searching of the data, is extracted from the data and added to the chunk filter 212. In the specific example where the data is user logs, the unique IDs of users are extracted from the log lines and added to the chunk filter 212. The chunk filter 212 is created based on the expected distribution of unique identifiers and the desired false positive rate. Here, a trade-off is made between the number of false positives, the cost of inserting keys in the chunk filter 212, and the size of the chunk filter 212. When the chunk 210 reaches some desired size, it is prefixed with the chunk filter 212 and then written to persistent storage 16, such as one or more hard disks 16.

Figure 3:
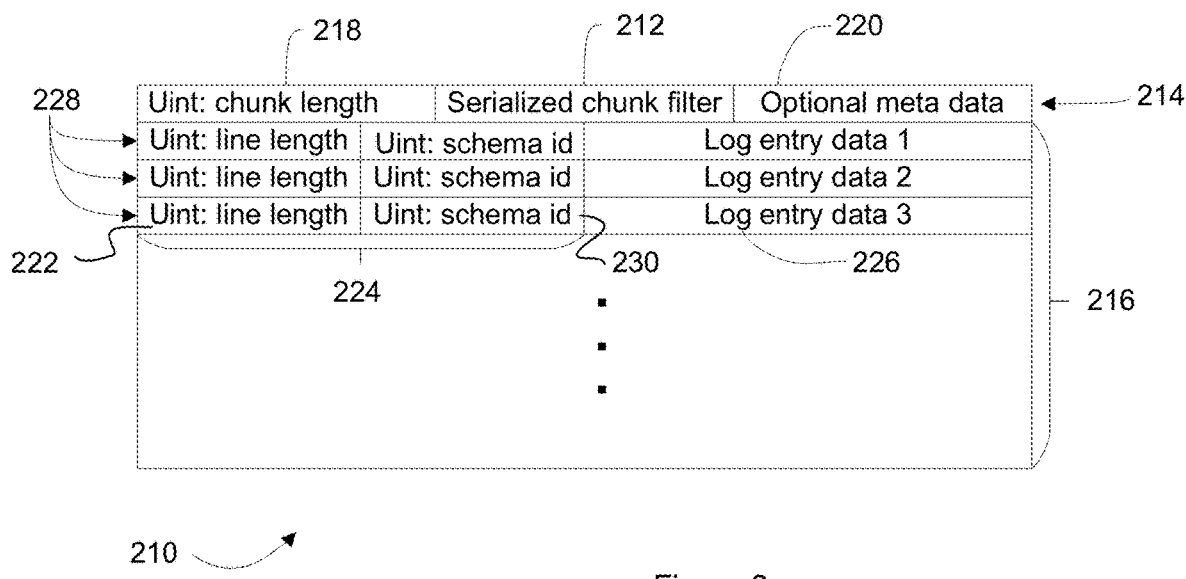
FIG. 3 shows schematically the structure of an example of a chunk of an example of the present disclosure.

FIG. 3 shows schematically the structure of an example of a complete chunk 210. In an example, the chunks 210 are the unit at which data is committed to persistent storage 16. The chunk 210 contains a chunk header 214 plus the chunk data 216. The chunk header 214 contains the chunk filter 212 (containing the information necessary to reconstruct it). The chunk filter 212 may be serialized. That is, the chunk filter 212 is represented in a form that makes it possible to reconstruct it. The chunk header 214 may also contain data identifying the chunk length 218. The chunk header 214 may also contain other optional meta data 220. Such other meta data 220 may include for example one or more of a time, which may be for example a time or range of times at which the log data 216 in the chunk 210 were created by users 20 or received at the computer system 10, etc.; raw text, reflecting certain text terms present in the log data 216 in the chunk 210; information identifying individual processes/computer systems/machines in the case that multiple different processes/computer systems/machines, respectively, provide input to the computer system 10; etc.

The chunk data 216 contains a set of lines of data 222. In the specific example where the data is user logs, the chunk data 216 contains a set of log lines 222. Each log line 222 in turn contains the data necessary to reconstruct it at query time. Each log line 222 also contains the necessary information to facilitate extraction of tenant IDs and user IDs in the specific example, and optionally other IDs. Specifically, in an example each log line 222 contains a small header 224 and the actual log entry 226. In the example shown, the header 224 contains information 228 concerning the total length of the log line 222. In the example shown, the header 224 also contains a schema identifier 230. This schema identifier 230 is used when determining how to extract the various identifiers from the raw data contained in the respective log entries 226 as it allows the various identifiers to be extracted regardless of the format in which they are stored in the raw data. By associating a set of methods or functions for extracting identifiers with schema identifiers 230, it is possible to support different log schemas in a generalized fashion. It also allows for log entries 226 with different schemas to be present within the same chunk 210, which improves the functionality of the process as it makes it more universally applicable. (In FIG. 3, the chunk length 218, the information 228 concerning the total length of the log line 222 and the schema identifier 230 are prefaced by "uint". This is "unsigned integer", that is, the integer is positive only.)

While the chunks 210 are the unit at which data is committed to persistent storage 16, the chunks 210 are in turn stored together in stream segments 206. An example of a stream segment 206 is shown schematically in FIG. 4. A stream segment 206 contains a number of chunks 210 and is stored as a single file in persistent storage 16, such as one or more hard disks 16, a shared/distributed network attached system such as Hadoop File System (HDFS), etc. The stream segment 206 thus serves as the unit at which data is managed in the computer system 10.

Similar to chunks 210 and as mentioned, filter structures are also maintained for the stream segments 206. The segment filters are, however, not populated with the same identifiers that are present in the chunk filters 212. Instead, a first identifier, which in an example provides a "coarser" filter than the second identifier used in the chunks 210 themselves, is used in the segment filters. The coarseness of this first identifier is of some importance: if it is not coarse enough, all stream segments 206 will contain it, and the value of the segment filter is diminished. In the specific example where the data is user logs, the first identifier is a tenant ID, as discussed above. In practice, the tenant ID is a reasonable choice since it captures the temporality of usage. In particular, a common case is that most (if not all) the users belonging to a single tenant are active within roughly the same time period of each day. If the false positive rate of the segment filters is kept low, this allows for effectively ruling out stream segments 206 that correspond to periods of inactivity for users belonging to that tenant.

If the tenant ID is used in the segment filters, this allows for quickly determining whether any log originating from any user of a given tenant is present in the stream segment 206 as it is only necessary to use the segment filter for this: it is not necessary at this stage to inspect each of the chunks 210 in the stream segments 206 themselves. If the answer is yes, the individual chunks 210 (or, more accurately, their filters 212) within the stream segment 206 are then inspected for data originating from one or more specific users.

Since a stream segment 206 contains multiple chunks 210 and each chunk 210 itself potentially contains a large amount of data (in the log lines 222 in the example above), it is generally not feasible to hold a stream segment 206 in its entirety in the memory 14 of the computer system 10. In such a case, a choice may be made with regard to how the segment filters are generated and stored. Three possible options include:

(1) The segment filter is appended at the end of the stream segment 206. This results in additional seek operations when the chunks 210 of the stream segments 206 are to be searched.

(2) By determining the size of the segment filter ahead of time, the necessary space can be preserved at the beginning of the stream segment 206. The segment filter can then be written into this space when the stream segment 206 is completed. This necessitates an additional seek operation at write time.

(3) The segment filters are not stored within the stream segment files 206 themselves, but rather in the respective stream partitions 204 that index the stream segments 206. This makes it possible to avoid having to read the stream segments 206 (at least initially for the initial search) but means that these stream partitions 204 must be used at query time.

Although each of these approaches has its merits, option (2) may be of particular advantage in some examples. This is because throughput is more important than latency when writing log data, whereas extra seek operations at read time will generally slow down the reading of the data, which generally is to be avoided when for example data concerning a particular tenant and/or user has to be located quickly.

Further up the hierarchy of data structures in this specific example are the stream partitions 204. A stream partition 204 may be regarded as a collection of stream segments 206. The stream partition 204 does not store any of the raw log entry data, but rather holds the information necessary to locate the stream segment files 206 belonging to the partition 204. The stream partition 204 thus serves as a referencing or an indexing structure and is used to direct the search of stream segment files 206 when the computer system 10 is serving data retrieval and deletion requests.

To support efficient search, each stream partition 204 can be richly annotated with meta data. Rules or stream policies governing how the stream partitions 204 are created can be used to generate stream partitions 204 that map well to the expected query patterns. For example, one policy for generating stream partitions 204 is that of time: it is possible to create stream partitions corresponding to data logged within 1 hour, 1 day, 1 week, and so forth. Another policy is that of capping stream partitions 204 based on size. Hybrid approaches, such as having stream partitions 204 cover at most one day, but never having a size of more than N gigabytes, are also possible.

To avoid relying on complex index structures that must be kept in memory or parsed in a specific manner, the stream partitions 204 can be implemented as flat text files containing a header and the file names of the corresponding stream segment files 206 indexed by the stream partition 204. The header may contain metadata that is useful for determining whether a query to the computer system 10 needs to evaluate the stream partition 204. One example of such meta data is the time interval covered by the stream partition 204. Another example for the specific example where the data is user logs is a list of tenants (e.g. tenant IDs) that have data in the stream partition 204. This enables a query to deterministically that a stream partition 204 contains data for a specific tenant for, for example, auditing purposes. For completeness, it is noted that if a very limited set of meta data is needed, the stream partitions 204 do not need to have a header. Instead, the necessary meta data can be incorporated into the file name of the stream partition 204 file itself. Such meta data may be for example the start time of the stream partition 204. Some meta data may also be added automatically by the computer system 10.

As noted above, in this specific example the total volume of data (here, generated logs) entering at 200 is split into multiple "log streams" 202, indicated as 202 #1, 202 #2, . . . 202 #N in FIG. 2. This allows high throughput of the data and better utilization of multi core (and multi computer) configurations.

In this example, each log stream 202 receives data, which has entered 200 the computer system 10, via a respective queue 232. The log streams 202 are further split into the stream partitions 204 described above. When a piece of data enters 200 the computer system 10, the data is consistently hashed 234 into one of the log streams 202 and put on its corresponding queue 232. (Consistent hashing is a special kind of hashing such that when a hash table is resized, only K/n keys need to be remapped on average, where K is the number of keys, and n is the number of slots. In contrast, in most traditional hash tables, a change in the number of array slots causes nearly all keys to be remapped because the mapping between the keys and the slots is defined by a modular operation.) The key used for this hashing is the same "coarse key" used in the segment filters discussed above. This provides for effectively limiting the number of files that must be evaluated when serving a subsequent data retrieval or deletion request. For example, if the tenant ID is used for this hashing key, all data corresponding or relating to that tenant will reside in the same log stream 202. Double hashing techniques may also be used to accommodate imbalances in the amount of data stored in different log streams 202. For example, if, after hashing, it is determined that the target log stream 202 would contain too much data, a second hash function could be applied to the key to determine an alternative log stream 202 for the data. At query time, the same hash function(s) can be applied on the ID of the tenant for which data should be retrieved or deleted. By doing this, it is possible to quickly exclude all files belonging to different log streams 202. In the example shown schematically in FIG. 2, this is implemented by associating a single folder 236 with each log stream 202. All stream segments files 206 belonging to that stream 202 are then stored in that folder 236, and only the stream segments files 206 within that folder 236 are candidates for evaluation at query time.

As mentioned, a number of different types of probabilistic filters may be used for the chunk filter 212 and for the segment filter. Specific examples include so-called Bloom filters and Cuckoo filters. These (in common with at least some other probabilistic filters) both share the trait that they can produce false positives, but never false negatives. Due to how they are implemented, Bloom filters offer slightly better performance when inserting new keys. However, Bloom filters do not support deletions. Rather, it is necessary to re-compute the filter by inserting all remaining identifiers. Cuckoo filters, on the other hand, support deletions natively and it is not necessary to re-compute the filters when a key is removed. If it is desirable to keep filters fully coherent with the contents of chunks 210 and/or stream segments 206, which filter structure to use is largely dependent on the operation mix. If many deletions are expected, Cuckoo filters may be preferred. In the case where deletes are infrequent, Bloom filters provide a cheaper solution. It is also possible to postpone cleanup/re-computation of the filters by storing the keys to be removed temporarily and then removing these from/re-computing the filters later in a batched fashion.

When deleting data entries from chunks 210 (and thus from stream segments 206), it is possible to reclaim data from deleted entries in an "eager" or "lazy" fashion. One example of an eager reclamation strategy is to delete the entry from the chunk 210 by iterating all the entries, keeping only those that should not be deleted, and then rewriting the chunk 210. This results in unused space between the tail of the modified chunk 210 and the next chunk 210 within the stream segment 206, which can be reclaimed by moving the following chunk 210. Another approach is that of delayed reclamation: rather than reclaiming the unused space at the time of deletion, the chunk 210 (and the stream segment 206) is marked as "dirty" (which can be accomplished by setting a "dirty bit" in the chunk header 214 and the stream segment header 208), and the bytes holding the deleted entry are zeroed out. The log entry itself is then marked as deleted (e.g. by setting a specific schema ID in the line's header). Later queries to the computer system 10 can use the length of the entry plus it being marked as deleted to skip the record. A reclamation routine is then executed at some later point in time, for example on a set schedule or when some specific condition is met. If a periodic or policy based delayed compaction/reclamation scheme is used, this can also handle delayed deletion from/re-computation of the filter structures. To avoid negative impact on the query performance (retrieval and deletion of data) of the computer system 10, the jobs reclaiming unused space can be scheduled to run when the computer system 10 is lightly loaded.

Figure 5:
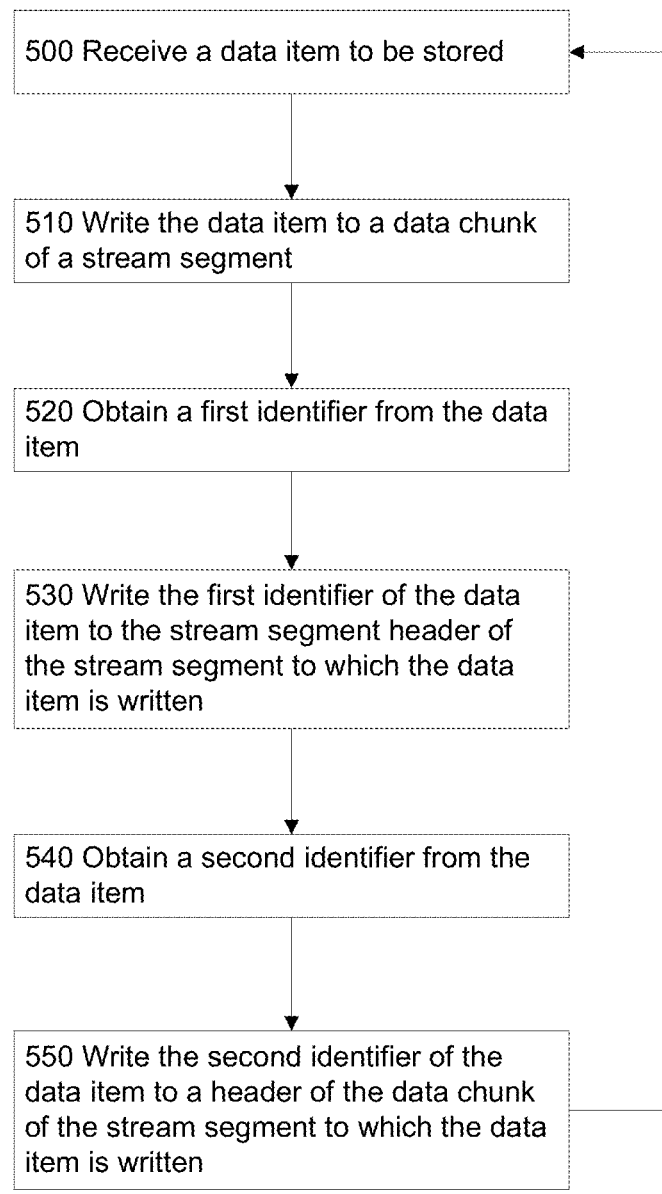
FIG. 5 shows schematically an example of a method of storing a data item in a computer system.

Referring now to FIG. 5, this shows schematically an example of a method of storing data items in a computer system.

At 500 a data item to be stored is received. At 510, the data item is written to a data chunk of a stream segment. In the example method of FIG. 5, the stream segment includes a stream segment header and a plurality of data chunks.

At 520, a first identifier is obtained from the data item. In some examples, the first identifier may be regarded as a coarse identifier. In accordance with some examples described herein, the first identifier is a tenant ID, which identifies a "tenant", which may be for example an organization, such as for example a business/company. In other examples, used in different applications, the first identifier may be some other identifier.

At 530, the first identifier of the data item is written to the stream segment header of the stream segment to which the data item is written.

At 540, a second identifier is obtained from the data item. The second identifier is different from the first identifier. In some examples, the second identifier may be regarded as a less coarse or fine identifier. In accordance with some examples described herein, the second identifier is a user ID, which identifies (human) users of the system. The users may be associated with one or more tenants in the case that the first identifier is a tenant ID. For example, each user may be an employee of a tenant. In other examples, used in different applications, the second identifier may be some other identifier.

At 550, the second identifier of the data item is written to a header of the data chunk of the stream segment to which the data item is written.

As a result, the first identifier in the stream segment header can be used to identify if any data items in any of the data chunks of the stream segments include the first identifier, and the second identifier in the header of the data chunk of the stream segment can be used to identify if any data items in the data chunk include the second identifier.

The operational flow may then return to 500 in which a new or further data item to be stored is received and the operation continued as described above.

Figure 6:
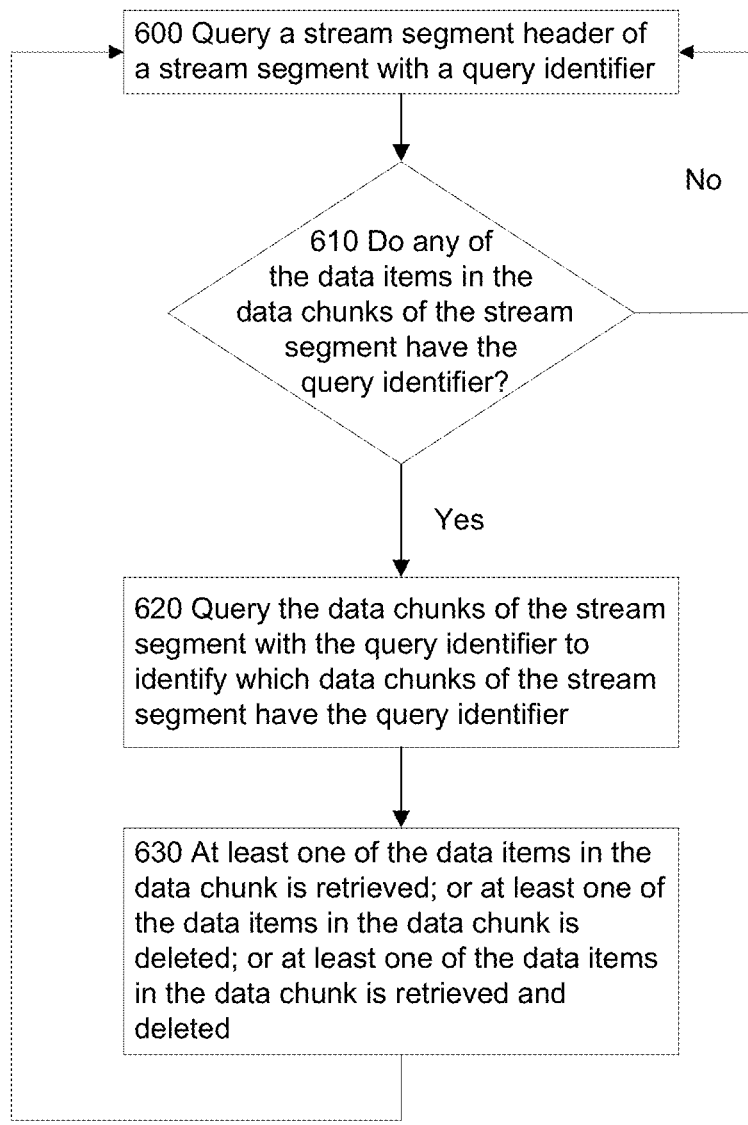
FIG. 6 shows schematically an example of a method of identifying a data item stored in a computer system.

Referring now to FIG. 6, this shows schematically an example of a method of identifying a data item which is stored in a computer system. In practice, there may be a large number of data items stored in the computer system.

At 600 a stream segment header of a stream segment is queried with a query identifier. In the example method of FIG. 6, the stream segment comprises a stream segment header and one or more data chunks. Each data chunk comprises data items and the stream segment header comprises identifiers of the data items in the data chunks. The querying of the stream segment header identifies if any of the data items in the data chunks of the stream segment may have the query identifier.

At 610, if none of the data items in the data chunks of the stream segment have the query identifier, flow returns to 600. The stream segment header of another stream segment (for example, the next stream segment) may then be queried with the query identifier. Otherwise, at 610, if any of the data items in the data chunks of the stream segment have the query identifier, flow moves to 620.

At 620, the data chunks of the stream segment are queried with the query identifier to identify which data chunks of the stream segment have the query identifier.

At 630 for at least one of the data chunks of the stream segment that has the query identifier: at least one of the data items in the data chunk is retrieved; or at least one of the data items in the data chunk is deleted; or at least one of the data items in the data chunk is retrieved and deleted. The flow may then return to 600, ready to query a stream segment header of a stream segment with another query identifier.

There now follows a description of some specific examples of how data can be inserted or logged into the computer system 10, retrieved from the computer system 10 and deleted from the computer system 10. These examples are given in terms of the specific example discussed above in which the data represents user logs, and in which a tenant ID is used as the coarse first identifier or key for consistent hashing and population of the segment filters, and the fine second identifier or key within the chunk filters 212 is a unique user ID. It will be understood that the same principles may be applied in other applications, for different types of data and using different identifiers. It will also be understood that not all of the operations described here are required in all implementations.

In an example, logging of data in a computer system 10 can be summarized by the following:

1. The log entry is created due to some interaction between a user and the computer system.
    a. The log line header 224 is populated with the schema ID 230 matching the log line 222 as well as the combined total length (size) 228 of the log entry data 226 and header 224.
2. The log entry is consistently hashed 234 to one of the streams 202 by:
    a. To extract the tenant ID to be used as a hashing key, the schema ID 230 in the line header 224 is used to look up a method or function that can perform this action.
    b. The method or function from a. is applied to the entry to extract the tenant ID to be used as the hashing key.
    c. The key is passed to the hash function 234.
    d. The entry is put on the queue 232 corresponding to the hash result.
3. The entry is dequeued from the stream queue 232 and processed by:
    a. The stream partition policies are evaluated, and if necessary a new stream partition 204 is created by:
        i. Writing the current chunk 210 to the current stream segment file 206.
        ii. Finalizing the current segment file 206 by adding its segment filter and storing it to persistent storage 16.
        iii. Adding the segment file name to the current stream partition 204, along with any meta data.
        iv. Updating any fields in the header of the current stream partition file 204 and writing the current stream partition 204 to persistent storage 16.
        v. Creating a new stream partition file 204.
    b. The tenant ID of the log entry is extracted and inserted into the filter of the current stream segment 206.
    c. The user ID of the log entry is extracted and inserted into the chunk filter 212 of the current chunk 210 of the current stream segment 206.

d. The log entry is appended to the current chunk data 216.
   i. If this results in the chunk 210 becoming full:
      1. The chunk 210 is appended to the stream segment file 206 and persisted to disk 16.
      2. If this results in the stream segment 206 being full:
         a. The segment filter is written to the stream segment 206.
         b. The segment file name is added to the current stream partition file 204.
         c. A new stream segment 206 is created.
      3. Create a new chunk 210.

In an example, identifying, and/or retrieving, all data corresponding to a given user from a specific tenant can be summarized by the following:
1. The tenant ID of the tenant is consistently hashed 234 to determine which log stream 202 contains data for that tenant.
2. Determine the set of stream partition files 204 that must be evaluated by:
   a. Getting the full set of stream partition files 204 in the stream folder 236.
   b. Using any supplied meta data (e.g. start date of the tenant's customer relationship) to reduce the set of stream partitions 204 that need to be evaluated.
3. For each stream partition file 204 that must be evaluated:
   a. Read the list of stream segment files 206 in the stream partition 204
   b. For each of the stream segment files 206:
      i. Query the segment filter with the tenant ID
         1. If the filter returns a false, continue with the next stream segment file 206. (This reflects the fact that the stream segment 206 may in general have data/log entries for multiple tenants.)
         2. If the filter returns a true, scan the stream segment file 206 by evaluating each of its chunks 210 as follows:
            a. Query the chunk filter 212 with the user ID.
            b. If the chunk filter 212 returns false, continue with the next chunk 210.
            c. If the chunk filter 212 returns true, scan the chunk 210 line by line 222 by:
               i. Extracting the schema ID 230 from the line header 224
               ii. Looking up the method for extracting tenant ID using the schema ID 230
               iii. Extracting the tenant ID from the log line entry 222
               iv. If the tenant ID of the log line entry 222 does not match the tenant ID from the query, continue to the next line 222
               v. Else, look up the method for extracting the user ID using the schema ID 230
               vi. Extract the user ID from the log line entry 222
               vii. Compare the user ID from the log line entry 222 to the user ID from the query
               viii. If the user IDs match, add the log line entry 222 to the result set.
4. Return the result set In an example, identifying, and/or retrieving, all data corresponding to a given tenant (rather than all data corresponding to a given user from a specific tenant as in the example above) can be summarized by the following:
1. The tenant ID of the tenant is consistently hashed 234 to determine which log stream 202 contains data for that tenant.
2. Determine the set of stream partition files 204 that must be evaluated by:
   a. Getting the full set of stream partition files 204 in the stream folder 236.
   b. Using any supplied meta data (e.g. start date of the tenant's customer relationship) to reduce the set of stream partitions 204 that need to be evaluated.
3. For each stream partition file 204 that must be evaluated:
   a. Read the list of stream segment files 206 in the stream partition 204
   b. For each of the stream segment files 206:
      i. Query the segment filter with the tenant ID
         1. If the filter returns a false, continue with the next stream segment file 206. (This reflects the fact that the stream segment 206 may in general have data/log entries for multiple tenants.)
         2. If the filter returns a true, scan the stream segment file 206 by evaluating each of its chunks 210 as follows:
            a. Scan the chunk 210 line by line 222 by:
               i. Extracting the schema ID 230 from the line header 224
               ii. Looking up the method for extracting tenant ID using the schema ID 230
               iii. Extracting the tenant ID from the log line entry 222
               iv. If the tenant ID of the log line entry 222 does not match the tenant ID from the query, continue to the next line 222
               v. Else, add the log line entry 222 to the result set.
4. Return the result set Finally, in an example to reclaim space used by deleted log line entries, the following can be executed:
1. For each stream segment file 206:
   a. If the stream segment 206 is not marked as dirty, continue with the next stream segment file 206
   b. Else, reclaim space within the stream segment file 206 by:
      i. Setting the initial offset into the stream segment 206 to zero (the offset being the (logical) distance from a current point in a file to the next point in the file)
      ii. For each chunk 210 in the stream segment 206:
         1. If the chunk 210 is not marked as dirty, continue with the next chunk 210
         2. Iterate over each of the log line entries 222 in the chunk 210
            a. If the line 222 is not marked as deleted, add it to the set of lines 222 to preserve
            b. Extract the user ID from the log line entry 222
            c. Add the user ID to the new chunk filter 212
         3. Write the new chunk 210 (with its filter 222) into the stream segment file 206 at the current segment offset
         4. Update the current segment offset by adding the size of the compacted chunk 210.

It may be noted that some examples described herein do not exclude use of e.g. compression or encryption of data, which further enables compact storing of the data. In particular, as first and second identifiers of the data are obtained from the data and are stored separately (in the stream segment header of the stream segment to which the data item is written for the first identifier, and in the header of the data chunk of the stream segment to which the data item is written for the second identifier), the data itself can be compressed and/or encrypted as it is not necessary to inspect the data itself when searching for data relating to the first and/or second identifier.

Much of the specific description above has been given in respect of a specific example where the data is user logs and the users are associated with an organization, such as a company. In such a case, the first identifier is a tenant ID, e.g. an ID for the organization, and the second identifier is a user ID, e.g. IDs for the users associated with that (or another) organization. As yet another example of the type of hierarchical or tiered structure for the identifiers, the first identifier may be an ID of a parent and the user IDs may be IDs of children of that parent.

Reference is made herein to data storage for storing data. This may be provided by a single device or by a plurality of devices. Suitable devices include for example a hard disk and non-volatile semiconductor memory (e.g. a solid-state drive or SSD), a shared/distributed network attached system such as Hadoop File System (HDFS), etc.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

What is claimed is:

1. A non-transitory computer-readable storage medium comprising a set of computer-readable instructions stored thereon that, when executed by a computer system, cause the computer system to perform operations, comprising:
   receiving, in a computer memory of the computer system, a data item to be stored;
   writing the data item to a data chunk of a stream segment, the stream segment including a stream segment header and a plurality of data chunks, the stream segment header including a segment filter;
   obtaining a first identifier from the data item;
   writing the first identifier of the data item to the segment filter of the stream segment header of the stream segment to which the data item is written;
   obtaining a second identifier from the data item, the second identifier being associated with the first identifier; and
   writing the second identifier of the data item to a header of the data chunk of the stream segment to which the data item is written, the first identifier in the segment filter of the stream segment header identifying whether any data items in any of the plurality of data chunks of the stream segment include the first identifier and the second identifier in the header of the data chunk of the stream segment identifying whether any data items in the data chunk include the second identifier.

2. The non-transitory computer-readable storage medium of claim 1, wherein the first identifier is a coarse identifier that applies to a first number of data items in the data chunks of the stream segment, and wherein the second identifier is a fine identifier that applies to a second, smaller number of data items in the data chunks of the stream segment.

3. A method for storing a data item, comprising:
   receiving, in a computer memory, a data item to be stored;
   writing the data item to a data chunk of a stream segment, the stream segment including a stream segment header and a plurality of data chunks, the stream segment header including a segment filter;
   obtaining a first identifier from the data item;
   writing the first identifier of the data item to the segment filter of the stream segment header of the stream segment to which the data item is written;
   obtaining a second identifier from the data item, the second identifier being related to the first identifier; and
   writing the second identifier of the data item to a header of the data chunk of the stream segment to which the data item is written, the first identifier in the segment filter of the stream segment header identifying whether any data items in any of the plurality of data chunks of the stream segment include the first identifier and the second identifier in the header of the data chunk of the stream segment identifying whether any data items in the data chunk include the second identifier.

4. The method of claim 3, wherein the first identifier is a coarse identifier that applies to a first number of data items in the data chunks of the stream segment, and wherein the second identifier is a fine identifier that applies to a second, smaller number of data items in the data chunks of the stream segment.

5. The method of claim 3, wherein the first identifier is a tenant identifier, which identifies an organization, and the second identifier is a user identifier, which identifies an individual user who is a member of the organization.

6. The method of claim 3, wherein the first identifier of the data item is written into a probabilistic data structure contained in the stream segment header of the stream segment to which the data item is written.

7. The method of claim 3, wherein the second identifier of the data item is written into a probabilistic data structure contained in the header of the data chunk of the stream segment to which the data item is written.

8. The method of claim 3, further comprising:
   carrying out consistent hashing on the first identifier obtained from the data item; and
   identifying the stream segment to which the data item is to be written based, at least in part, on the result of the consistent hashing on the first identifier obtained from the data item.

9. The method of claim 8, wherein the stream segment is part of a log stream, there being plural log streams each containing different one or more stream segments, and wherein identifying the stream segment to which the data item is to be written based on the result of the consistent hashing comprises identifying the log stream having the stream segment based on the result of the consistent hashing.

10. The method of claim 3, wherein:
   writing the data item to a data chunk of a stream segment comprises writing the data item as a line entry in the data chunk, the line entry comprising a line header, and comprising:
   writing a schema ID to the line header, the schema ID identifying how to extract at least one of the first identifier and the second identifier from the data item.

11. The method of claim 3, further comprising:
   writing data concerning the data item to a stream partition such that the stream partition indexes the stream segment to which the data item is written.

12. A non-transitory computer-readable storage medium comprising a set of computer-readable instructions stored thereon, which, when executed by a computer system, cause the computer system to perform operations, comprising:
   querying a stream segment header of a stream segment with a query identifier, wherein the stream segment comprises a stream segment header including a first identifier to which a coarse filter is applied, the stream segment header also including an associated segment filter and one or more data chunks, each of the one or more data chunks having respective second identifiers that are associated with the first identifier and to which a fine filter is applied, wherein the querying of the stream segment header identifies whether any data items in the data chunks of the stream segment have the query identifier;
   based on determining at least one data item in the data chunks of the segment filter have the query identifier, querying the data chunks of the stream segment with the query identifier to identify which data chunks of the stream segment have the query identifier; and
   retrieving or deleting at least one of the data items in at least one of the data chunks of the stream segment that has the query identifier.

13. The non-transitory computer-readable storage medium of claim 12, further comprising instructions for:
   querying the data items in the data chunks to identify which data items in the data chunks have the query identifier; and
   retrieving all or deleting all of the data items in all of the data chunks of the stream segment that have said query identifier.

14. The non-transitory computer-readable storage medium of claim 12, wherein identifiers of the data items are contained in a probabilistic data structure in the stream segment header.

15. The non-transitory computer-readable storage medium of claim 12, further comprising instructions for:
   querying the header of each of the data chunks with a second query identifier to identify whether any data items in the data chunks have the second query identifier.

16. The non-transitory computer-readable storage medium of claim 15, further comprising instructions for querying the data items in the data chunk to identify which data items in the data chunk have the second query identifier.

17. The non-transitory computer-readable storage medium of claim 15, wherein the coarse filter identifies a first number of data items in the data chunks of the stream segment, and wherein the fine filter identifies a second, smaller number of data items in the data chunks of the stream segment.

18. The non-transitory computer-readable storage medium of claim 12, wherein the first identifier is a tenant identifier, which identifies an organization, and the second identifier is a user identifier, which identifies an individual user who is a member of the organization.

19. The non-transitory computer-readable storage medium of claim 12, wherein the second identifiers of the data items are contained in a probabilistic data structure in the header of the data chunks.

20. The non-transitory computer-readable storage medium according to claim 12, wherein the data items are line entries in the data chunks, each line entry comprising a line header, each line header comprising a schema ID which identifies how to extract an identifier from the data item, and wherein the computer-readable instructions are such that querying the data items in a data chunk to identify which data items in the data chunk have the query identifier comprises inspecting the schema ID from the line header of a line entry and using the identified schema to extract the identifier from the line entry.

* * * * *